United States Patent [19]

Holcomb, Jr.

[11] 4,217,974

[45] Aug. 19, 1980

[54] BAND BRAKE ASSEMBLY

[75] Inventor: Orla L. Holcomb, Jr., South Bend, Ind.

[73] Assignee: The Bendix Corporation, Southfield, Mich.

[21] Appl. No.: 892,634

[22] Filed: Apr. 3, 1978

[51] Int. Cl.² ............................................. F16D 49/12
[52] U.S. Cl. ............................... 188/77 R; 188/70 R; 188/71.4
[58] Field of Search .................. 188/70 R, 70 B, 71.1, 188/71.4, 71.5, 72.2, 72.5, 72.7, 77 R, 370, 106 P; 192/65, 80

[56] References Cited

U.S. PATENT DOCUMENTS

| | | | |
|---|---|---|---|
| 1,135,885 | 4/1915 | Fawver | 188/77 R |
| 2,014,903 | 9/1935 | Logan | 188/77 R |
| 2,955,680 | 10/1960 | Caero | 188/70 B |
| 3,116,817 | 1/1964 | Quick et al. | 188/77 R |
| 3,313,381 | 4/1967 | Harting et al. | 188/71.5 |
| 3,557,911 | 1/1971 | Ellard | 192/80 |

FOREIGN PATENT DOCUMENTS

| | | | |
|---|---|---|---|
| 1167670 | 4/1964 | Fed. Rep. of Germany | 188/70 B |
| 1199950 | 9/1965 | Fed. Rep. of Germany | 188/77 R |
| 1957085 | 5/1971 | Fed. Rep. of Germany | 188/72.5 |
| 899063 | 5/1945 | France | 188/77 R |
| 1199203 | 12/1959 | France | 188/70 B |
| 650056 | 12/1962 | Italy | 188/106 P |

*Primary Examiner*—Edward R. Kazenske
*Attorney, Agent, or Firm*—Paul David Schoenle; Ken C. Decker

[57] ABSTRACT

The present invention relates to an improvement in a band brake wherein a plurality of rotors and stators provide for braking a rotatable member when a friction lining on the band brake is engageable with the rotatable member. The rotatable member carries an axially extendible assembly which is engageable with the friction lining to provide for extension of the axially extendible assembly. When the assembly is extended, the rotors which rotate with the rotatable member and the stators which are carried by a support housing are moved axially into frictional engagement with each other. The extendible assembly comprises a first element carried by a key on the rotatable member to impart rotation with the rotatable member and permit axial movement relative to the rotatable member, and a second element resiliently connected to the first element. The first element and second element include a cam therebetween such that when the second element engages the friction lining of the band brake, the second element rotates through a limited angle relative to the first element to increase the axial spacing between the elements by the action of the cam. The first element is also engageable with the friction lining to eliminate noise and instability in the action between the elements and the cam. In order to engage the friction lining with the rotatable member, the support housing forms a hydraulic actuator with at least one piston and a pair of links which are pivotably connected to each other cooperate with the friction lining when the hydraulic actuator is operated to contract the friction lining into engagement with the rotatable member.

1 Claim, 4 Drawing Figures

BAND BRAKE ASSEMBLY

BACKGROUND OF THE INVENTION

In a band brake assembly a piston cooperates with a pair of links which connect with a strap such that actuation of the piston toward a rotatable member causes the strap to contract an attached friction lining into engagement with a rotatable member to retard rotation of the latter.

When a plurality of rotors and stators are associated with the rotatable member, it is known that the friction lining on the strap can engage a portion of an extendible assembly to compress the rotors and stators together, thereby further providing for retarding the rotation of the rotatable member. The rotors are mounted on the rotatable member for rotation with the latter and for axial movement along the axis of rotation of the rotatable member. The stators are mounted on a housing which rotatably supports the rotatable member and which also provides for axial movement of the stators while preventing the latter from rotating with the rotatable member.

SUMMARY OF THE INVENTION

The present invention relates to an improvement in the aforementioned band brake. The extendible assembly comprises a first element coupled to the rotatable member and a second element resiliently coupled to the first element to provide for limited rotation between the first and second elements. A ball carried between the first and second elements cooperates with cam surfaces on the first and second elements such that rotation of the first element relative to the second element causes the first and second elements to extend axially, thereby compressing a plurality of adjacent rotors and stators. In order to eliminate noise, the band brake provides a friction lining which not only engages one of the elements to impart limited rotation between the first and second elements, but also engages the other of the elements to frictionally dampen the relative movement between the elements.

In addition, the band brake includes a pair of links which are pivotally connected at a location between a hydraulic actuator and the strap such that operation of the hydraulic actuator causes the pair of links to pivot about their pivotal connection. In a preferred embodiment the hydraulic actuator comprises a pair of pistons, one of the pistons being offset from the other piston and having a different diameter than the other piston.

DETAILED DESCRIPTION

Figure 1:
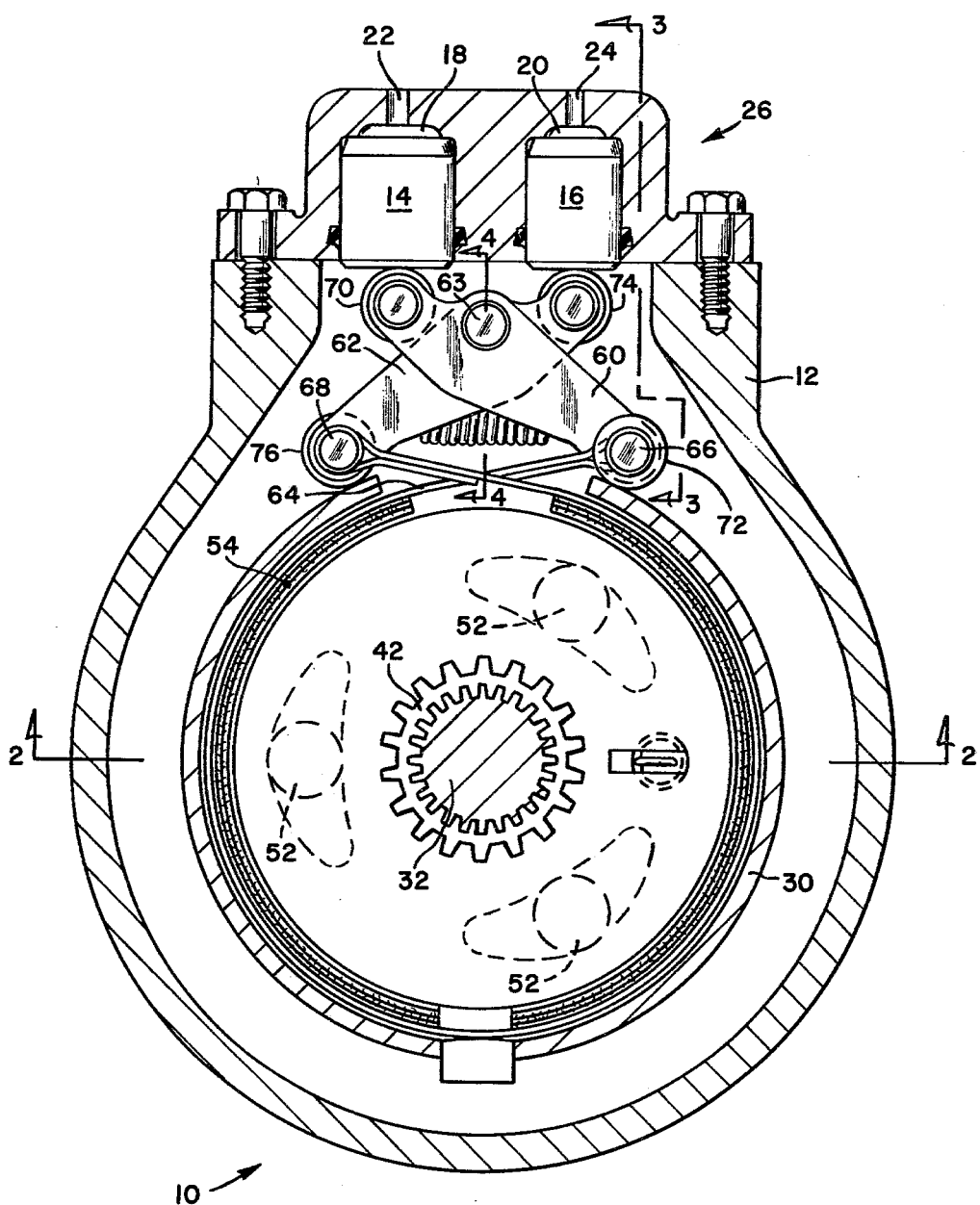
FIG. 1 is an end view of a brake assembly constructed in accordance with the present invention.

A band brake assembly, illustrated in FIG. 1, is generally referred to as reference numeral 10. A housing 12 cooperates with a first piston 14 and a second piston 16 to form pressure chambers 18 and 20 which communicate with a pressure source (not shown) via ports 22 and 24. The pistons form a hydraulic actuator 26 which is operable when pressurized fluid is communicated to the pressure chamber 18 and 20.

Figure 2:
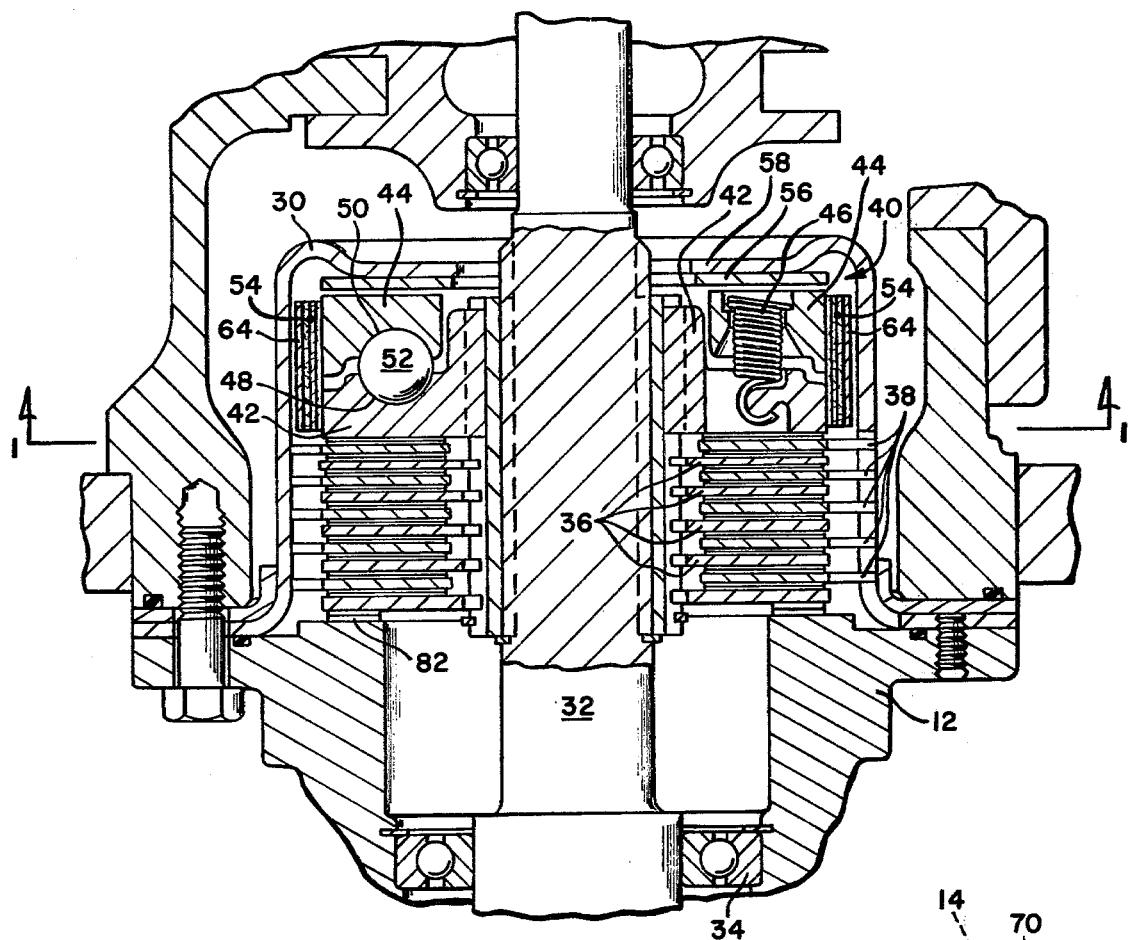
FIG. 2 is a cross-sectional view taken along line 2—2 of FIG. 1.

A casing 30 surrounds a rotatable member 32 and attaches to the housing 12 which rotationally supports the rotatable member via suitable bearing means 34, see FIG. 2.

Turning to FIG. 2, the rotatable member 32 is splined to receive a plurality of rotors 36 which interlock with the splined portion of the rotatable member 32 to rotate with the latter. The casing 30 supports a plurality of stators 38 which are interposed between the plurality of rotors. In a well-known manner, the rotors or stators carry friction elements which cooperate when the rotors and stators are compressed together to retard the rotation of the rotors.

In order to compress the assembly of rotors and stators, an extendible assembly 40 is carried by the splined portion of the rotatable member 32. The extendible assembly 40 comprises a first element 42 which interlocks with the splines of the rotatable member to rotate with the latter, and a second element 44 which is resiliently coupled to the first element 42 via springs 46 to permit limited rotation between the first element and the second element. The first element and the second element form cam surfaces at 48 and 50, respectively, and balls 52 are retained between the cam surfaces by the spring 46 urging the elements toward each other.

Viewing FIGS. 1 and 2, it is seen that a friction lining 54 surrounds the elements 42 and 44, and is engageable with both of these elements to retard the rotation of the elements and the rotatable member. In accordance with the invention, the friction lining is radially contracted in a manner hereinafter described to engage the first element 42 and the second element 44. As the interface between the second element 44 and the radially contracted friction lining 54 is greater than that between the first element 42 and the friction lining 54, the first element 42 is rotated slightly relative to the second element 44 by the torque imparted by the rotating member 32. This slight rotation between the elements causes the cam surfaces 48 and 50 to also rotate relative to each other so that the balls 52 roll on the cam surfaces to urge the first element 42 to move axially away from the second element 44 which is prevented from moving axially away from the first element by an end plate 56 carried by a radially inturned flange 58 on the casing 30.

It is a primary feature of the present invention that the radially contracted friction lining 54 engages both elements 42 and 44. Although the lining 54 engages the element 42, the friction forces therebetween merely dampen the tangential movement of the first element 42, thereby eliminating noise in the extension of the extendible assembly 40.

Figure 3:
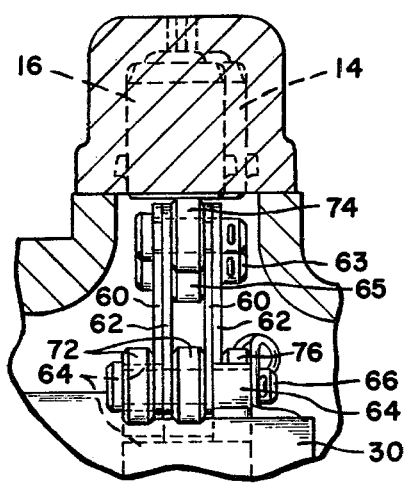
FIG. 3 is a cross-sectional view taken along line 3—3 of FIG. 1.
Figure 4:
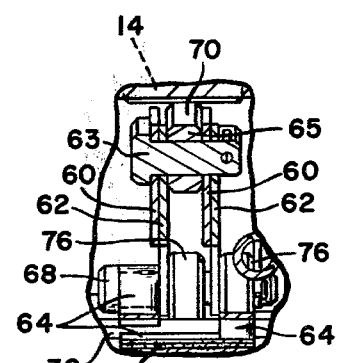
FIG. 4 is a cross-sectional view taken along line 4—4 of FIG. 1.

In order to contract the friction lining 54 into engagement with the element 42 and 44, two pair of links 60 and 62, see FIG. 3, are pivotally connected to each other in a crosswise manner via a pin 63 located between the pistons 14 and 16 and the friction lining 54. A strap 64 carries the friction lining 54 and connects with pins 66 and 68 carried by respective links 60 and 62. Each link 60 connects with a roller 70 engaging the piston 14 and rollers 72 engaging the outer surface of the casing 30, while each link 62 connects with a roller 74 engaging the piston 16 and connects with rollers 76 engaging the outer surface of the casing 30. The pin 63 carries a spacer 65 to separate each pair of links.

The piston 14 defines a large diameter with the housing 12 and the piston 16 defines a small diameter with the housing 12, so that separate operation of each piston can be used to impart different contraction forces to the friction lining 54.

MODE OF OPERATION

When pressurized fluid is communicated to the pressure chambers 18 and 20, the pistons 14 and 16 are urged toward the rotatable member 32 to pivot each pair of links 60 and 62 about pin 63. The rollers 72 and 76 roll on the outer surface of the casing 30 and each roller 70 and 74 rolls on the outer face of the pistons 14 and 16, thereby moving the pin 66 away from the pin 68. As the ends of the overlapping strap 64 connect with the pins 66 and 68 and carry the friction lining 54, the separation of the pins 66 and 68 causes the friction lining 54 to radially contract into engagement with the first and second elements to retard the rotation of the rotatable member.

Viewing FIG. 2, the radially contracted friction lining 54 engages the second element 44 with a greater interface than with the first element 42 so that the resistance to rotation is greater for the second element than for the first element. Consequently, limited rotation between the elements occurs, thereby causing the balls 52 to roll over the cam surfaces 48 and 50 to urge the elements to separate. As the second element is in greater frictional engagement with the friction lining 54 and opposes the plate 56, the first element 42 is urged away from the second element. The separation of the first element from the second element engages the plurality of rotors 36 with the plurality of stators 28 and compresses the same between the first element and a shoulder 82 on the housing 12. Consequently, the rotation of the rotatable member 32 is retarded via the resistance to rotation imparted to the rotors by the stators and the interlocking fit between the rotors and the rotatable member 32. Moreover, a smaller resistance to rotation is imparted to the rotatable member via the engagement of the friction lining 54 with the first element and its interlocking fit with the rotatable member 32.

It is possible to actuate only piston 16, or only piston 14, of the hydraulic actuator 26. For example, if pressurized fluid is communicated to only chamber 20, the piston 16 is urged toward the rotatable member 32 to pivot each pair of links 60 and 62 about pin 63. The pivoting of each pair of links causes the friction lining 54 to radially contract into engagement with the first and second elements; however, as the piston 16 is smaller in diameter than the piston 14, the pressurized fluid communicated to chamber 16 will effectuate a light brake application. In contrast thereto, it is possible to pressurize only chamber 18 thereby initiating a heavy brake application as the piston 14 is larger in diameter than the piston 16 and the pressurized fluid in chamber 18 will impart a greater force on the piston 14 than if the pressurized fluid is communicated to the pressure chamber 20.

In conclusion, the band brake assembly 10 provides for damping the extension of the extendible assembly 40 and for individual actuation of each piston 14 and 16 to control the sensitivity of the brake assembly. It is obvious that many variations of the present invention are possible by one skilled in the art and these variations fall within the scope of the appended claims.

I claim:

1. In a band brake assembly having a strap supporting a friction lining which is engageable with a rotatable member, the rotatable member being supported by a housing, and an actuator operable to contract the friction lining to a position retarding the rotation of the rotatable member, characterized by the actuator comprising two pistons movable toward the rotatable member when the actuator is operated and a pair of links engaging the pistons and connecting with ends of the strap, said pair of links being pivotally connected at a position between the pistons and the strap, said pistons being movable toward the rotatable member to pivot said pair of links about the pivotal connection therebetween in order to contract the friction lining into engagement with the rotatable member, the pair of links having rollers at each end and a casing attaches to the housing and substantially encloses the friction lining, one of said pair of links having a first roller engaging one of said pistons and a second roller engaging the outer surface of the casing, and the other link having a first roller engaging the other of said pistons and a second roller engaging the outer surface of the casing.

* * * * *